(12) United States Patent
Osborne (10) Patent No.: US 9,579,700 B2
(45) Date of Patent: Feb. 28, 2017

(54) MEASUREMENT AND MODELING OF SALINITY CONTAMINATION OF SOIL AND SOIL-WATER SYSTEMS FROM OIL AND GAS PRODUCTION ACTIVITIES

(71) Applicant: ITERIS, INC., Santa Ana, CA (US)

(72) Inventor: Leon F. Osborne, Grand Forks, ND (US)

(73) Assignee: ITERIS, INC., Santa Ana, CA (US)

( * ) Notice: Subject to any disclaimer, the term of this patent is extended or adjusted under 35 U.S.C. 154(b) by 0 days.

(21) Appl. No.: 14/725,139

(22) Filed: May 29, 2015

(65) Prior Publication Data

US 2015/0347647 A1 Dec. 3, 2015

Related U.S. Application Data

(60) Provisional application No. 62/005,032, filed on May 30, 2014.

(51) Int. Cl.
*G06G 7/58* (2006.01)
*B09C 1/00* (2006.01)

(52) U.S. Cl.
CPC .................... *B09C 1/002* (2013.01)

(58) Field of Classification Search
CPC .... A01G 25/167; A01G 25/16; A01G 25/092; A01G 17/02; A01G 1/00; A01G 25/02; A01G 31/00; Y10T 137/189; Y10T 137/1866; Y10T 137/86389; A01N 43/90; C07D 487/08; G06Q 10/00; Y02P 60/216; B09C 1/002
USPC ............................................................. 703/9
See application file for complete search history.

(56) References Cited

U.S. PATENT DOCUMENTS 6,738,082 B1 * 5/2004 Dong .................. G06F 17/3071
707/E17.091
9,085,958 B2 * 7/2015 Laing .................... E21B 49/003

OTHER PUBLICATIONS

Noory_2011 (Distributed agro-hydrological modeling with SWAP to improve water and salt management of the Voshmgir Irrigation and Drainage Network in Northern Iran, Agricultural Water Management 98 (2011) pp. 1062-1070).*
SWAP_1997 (Theory of SWAP version 2.0: Simulation of water flow, solute transport and plant growth in the Soil-Water-Atmosphere-Plant environment, Report 71: Department Water Resource, Wageningen Agricultural University, 1997).*

(Continued)

*Primary Examiner* — Aniss Chad
*Assistant Examiner* — Brian S Cook
(74) *Attorney, Agent, or Firm* — Lazaris IP (57) ABSTRACT

An analytical framework and modeling process for assessing salinity contamination of soil ecosystems in geographical areas related to oil and gas production sites combines detection and monitoring of unplanned saltwater releases from such production activities with soil impact prediction. The analytical framework and modeling process enables an assessment of risks associated with saltwater disposal from drilling operations to the surrounding environment and the impact on soils, aquifers, rangeland, cropland, and adjoining areas by monitoring water movement and other soil conditions, and generating predictive output data for landowners, farmers, oil and gas production site operators, governmental regulators, and other end users for contamination mitigation and agricultural activities.

23 Claims, 2 Drawing Sheets

(56) References Cited

OTHER PUBLICATIONS

Veil_2004 (A White Paper Describing Produced Water from Production of Crude Oil, Natural Gas, and Coal Bed Methane, U.S. Department of Energy National Energy Technology Laboratory Under Contract W-31-109-Eng-38, Jan. 2004).*
GRASS_GIS_2013 (Image processing in GRASS GIS, http://web.archive.org/web/20130115142555/http://grass.osgeo.org/grass64/manuals/imager . . . Jan. 13, 2013).*
Jovanovic_2001 (Modeling irrigation with gypsiferous Mine Water: a case study in Botswana, Mine Water and the Environment (2001) 20: 65-72).*
Bouksila (Assessment of soil salinization risks under irrigation with brackish water in sermiarid Tunisia, Environmental and Experimental Botany 92 (2013) 176-185).*
Stolt_1991.pdf Stolt, M.H., Potential for Contamination of Ground and Surface Waters from On-site Wastewater Disposal Systems: Final Report to the Virginia Department of Health, 1991.*
Ines, A.V.M., Crop Growth and Soil Water Balance Modeling to Explore Water Management Options, Working Paper 22, International Water Management Institute, ISBN 92-9090-458-5, 2001.*
Feddes, R.A., Soil-Water-Atmosphere-Plant (SWAP) Model: I. Introduction and Theoretical Background, Agridema Course , Vienna, Nov. 2005.*
Qadir, M., Chapter 11: Agricultural use of marginal-quality water-opportunities and challenges, IWMI Part 4 Ch8-16 pp. 425-457, 2007.*
Bouksila, F., Assessment of soil salinization risks under irrigation with brackish water in semiarid Tunisia, Environmental and Experimental Botany 92 (2013) 176-185.*
Ladeiro, B., Saline Agriculture in the 21st Century: Using Salt Contaminated Resources to Cope Food Requirents, Hindawi Publishing Corporation, Journal of Botany, vol. 2012, Article ID 310705, 7 pages.*
Hongua, Z., Effect of Water resources on soil salinization of oasis in the lower reaches of Tarim River, China, Procedia Environmental Sciences 11 (2011) 925-933.*
Ma, Y., Application of the SWAP model to simulate the field water cycle under deficit irrigation in Beijing, China, Mathematical and Computer Modeling 54 (2011) 1044-1052.*
Soil-moisture-balance_2013.pdf 6. Soil Water Balance, Sep. 15, 2013 http://web.archive.org/web/20130915102243/http://www.treemail.nl/download/treebook7/s . . . .*
Richards Equation Defined: Archived Wikipedia Jan. 25, 2014 https://en.wikipedia.org/w/index.php?title=Richards_equation &oldid=592393176.*
Vehicle Defined Dictionary.com Collins English Dictionary—Complete & Unabridged 2012.*
Metternicht, G., Remote Sensing of Soil Salinization: Impact on Land Management, 2009.*
Metternicht, G., (eds.) Remote Sensing of Soil Salinization, Chapter 13: Mapping Salinity Hazard: An Integrated Application of Remote Sensing and Modeling-Based Techniques, CRC Press, 2009.*
Li_2008, Li, W.Q., Relationship between soil characteristics and halophytic vegetation in coastal region of north china, Pak. J. Bot., 40(3): 1081-1090, 2008.*

* cited by examiner

MEASUREMENT AND MODELING OF SALINITY CONTAMINATION OF SOIL AND SOIL-WATER SYSTEMS FROM OIL AND GAS PRODUCTION ACTIVITIES

CROSS-REFERENCE TO RELATED APPLICATION(S)

This patent application claims priority to U.S. provisional application 62/005,032, filed on May 30, 2014, the contents of which are incorporated in their entirety herein. In accordance with 37 C.F.R. §1.76, a claim of priority is included in an Application Data Sheet filed concurrently herewith.

FIELD OF THE INVENTION

The present invention relates to saltwater and/or sodium chloride contamination of soils and the surrounding environment. Specifically, the present invention relates to systems and methods of measuring and modeling salinity contamination of soils related to extracting carbons such as oil and gas from the earth.

BACKGROUND OF THE INVENTION

Salinity contamination of soils and aquifers from exposure to high amounts of saltwater can cause adverse and long lasting impacts as salt accumulates or disassociates, leaving sodium ion particles that raise the sodicity of soil and potentially reduce soil texture. The accumulation of saltwater in soils can cause damage by destroying soil structure and permeability. Seed germination may be reduced in the presence of high concentrations of soluble salts, which limit a plant's ability to uptake water. With sufficient concentrations, salt-contaminated soil can lose its ability to support agricultural crops and other vegetation. Over time this may further contribute to erosion.

Recent trends in the field of oil and gas drilling include the use of hydraulic fracturing, which is commonly referred to as fracking. Hydraulic fracturing is a process employed to stimulate a natural gas, oil, or geothermal energy well to maximize the extraction of resources from the well. Generally, hydraulic fracturing involves injection of massive amounts of fluids, such as saltwater, into a well at high pressure to create fractures in rock formations, such as shale, that contain subterranean hydrocarbon reservoirs. Products extracted from a typical oil well involving hydraulic fracturing are crude oil and natural gas, along with the injected saltwater, which becomes an unwanted byproduct of the process. Over the production lifetime, the percentage of saltwater from a well producing oil or gas increases, and a newly-drilled well can initially produce one barrel of saltwater for every two barrels of hydrocarbons extracted. Over time, that ratio can grow to 10 barrels of saltwater for every barrel of hydrocarbons. The water extracted from such wells can easily contain over 250,000 parts per million of various types of salts, nearly equal to the waters of the Dead Sea and almost 10 times the salinity of ocean water.

Oil and gas well operators are required to properly dispose of the saltwater by-product in an environmentally responsible manner. Saltwater is typically disposed of in one of three ways. One way involves using the saltwater by-product to enhance oil production by injecting the saltwater back into an oil-producing formation. Another approach involves evaporation of water content to produce solid salt that can be collected. In a third approach, saltwater may also be injected into an underground formation that contains a natural saline aquifer. This third approach is termed saltwater disposal (SWD) and is the predominant method of disposal. Before either of the second (evaporation) or third (SWD) methods take place, saltwater is stored at the production site in a handling facility that may be a tank, pit, or pool, and transfer of saltwater to a disposal site is undertaken either by tanker truck or pipeline.

There are significant challenges with managing SWD, as indicated by the current assessment of oil and gas production development in the North Dakota Bakken Formation. Well operators currently inject around 468,000 barrels of saltwater a day into saltwater disposal sites related to the Bakken drilling activity. Future development of this production could require approximately 1,600 additional SWD wells, which currently can be built for $2 million to $3 million per well. For the next 50 to 60 years, these wells could potentially utilize roughly 10,000 barrels of saltwater per day of operation, creating a significant increase in saltwater to be disposed of. With the need to store saltwater quantities of this magnitude at handling facilities and transfer those quantities to SWD wells, the risk for potential leakage or spillage into surrounding soils and aquifers is a major concern.

While spillage of saltwater at an active production site can lead to significant soil contamination, these events are often easier to monitor and therefore can be quickly addressed. The greater risk of soil contamination, especially to rangeland and cropland, occurs both between the production location and a SWD site, and at the SWD site itself. This is especially true for saltwater transfer by pipeline, and storage in holding tanks, either above or below ground, as breaks or leaks can go undetected for an extended period. This can lead to significant long-term effects on soils, aquifers, rangeland, and cropland.

The unplanned release of saltwater brine resulting from truck and/or pipeline transport of brine, leakage from containment ponds associated with active oil and gas drilling, and at SWD sites presents a host of contamination problems with wide-ranging effects on soils, vegetation, crops, livestock, and people. For example, unintended releases of saltwater brine have the capacity to infiltrate soils and sufficiently alter its pH so as to deteriorate crop productivity. Further, if the infiltration is sufficient and sustained for a period of time, in extreme cases it can lead to a horizontal movement in soils resulting in an expansion in the contamination area and causing a wide-ranging impact cropland. Under such situations this can also lead to the contamination of groundwater supplies and present a threat to drinking water for both humans and animals. Episodes of excessive or prolonged precipitation can further exacerbate this problem if undetected.

BRIEF SUMMARY OF THE INVENTION

It is therefore one object of the present invention to provide a system and method of modeling salinity and saltwater contamination of soils in areas where by-product of oil and gas drilling is disposed of. It is another object of the present invention to provide a system and method of assessing risks associated with saltwater disposal from oil and gas drilling sites to the surrounding environment and the agricultural and environment impact on rangeland, cropland, and aquifers. It is still another objective of the present invention to monitor and assess soil conditions in such areas and generate forecasts, predictions, and recommendations as downstream or follow-on services for landowners, farmers, oil and gas production site operators, governmental regulators, and other end users for contamination mitigation activities, as well as the associated impacts that affect crops and agricultural activities.

The present invention is a framework for modeling salinity contamination in soils that combines detection, measurement and monitoring of unplanned saltwater releases from oil and gas production activities with soil and agricultural and environmental impact prediction. The present invention utilizes remote sensing platforms to detect and monitor the presence of saltwater in soils, and upon detection, assesses impact on vegetation and current and future soil contamination. The framework includes a soil salinity transport model that combines data such as information on native soils, soil samples, ground water and watershed information, agricultural and crop information, and weather information to analyze the extent of future soil salinity and sodicity, and the possibility of vertical and lateral movement of saltwater within soils.

Other objects, embodiments, features and advantages of the present invention will become apparent from the following description of the embodiments, taken together with the accompanying drawings, which illustrate, by way of example, the principles of the invention.

BRIEF DESCRIPTION OF THE SEVERAL VIEWS OF THE DRAWINGS

The accompanying drawings, which are incorporated in and constitute a part of this specification, illustrate several embodiments of the invention and together with the description, serve to explain the principles of the invention.

DETAILED DESCRIPTION OF THE INVENTION

In the following description of the present invention reference is made to the exemplary embodiments illustrating the principles of the present invention and how it is practiced. Other embodiments will be utilized to practice the present invention and structural and functional changes will be made thereto without departing from the scope of the present invention.

Figure 1:
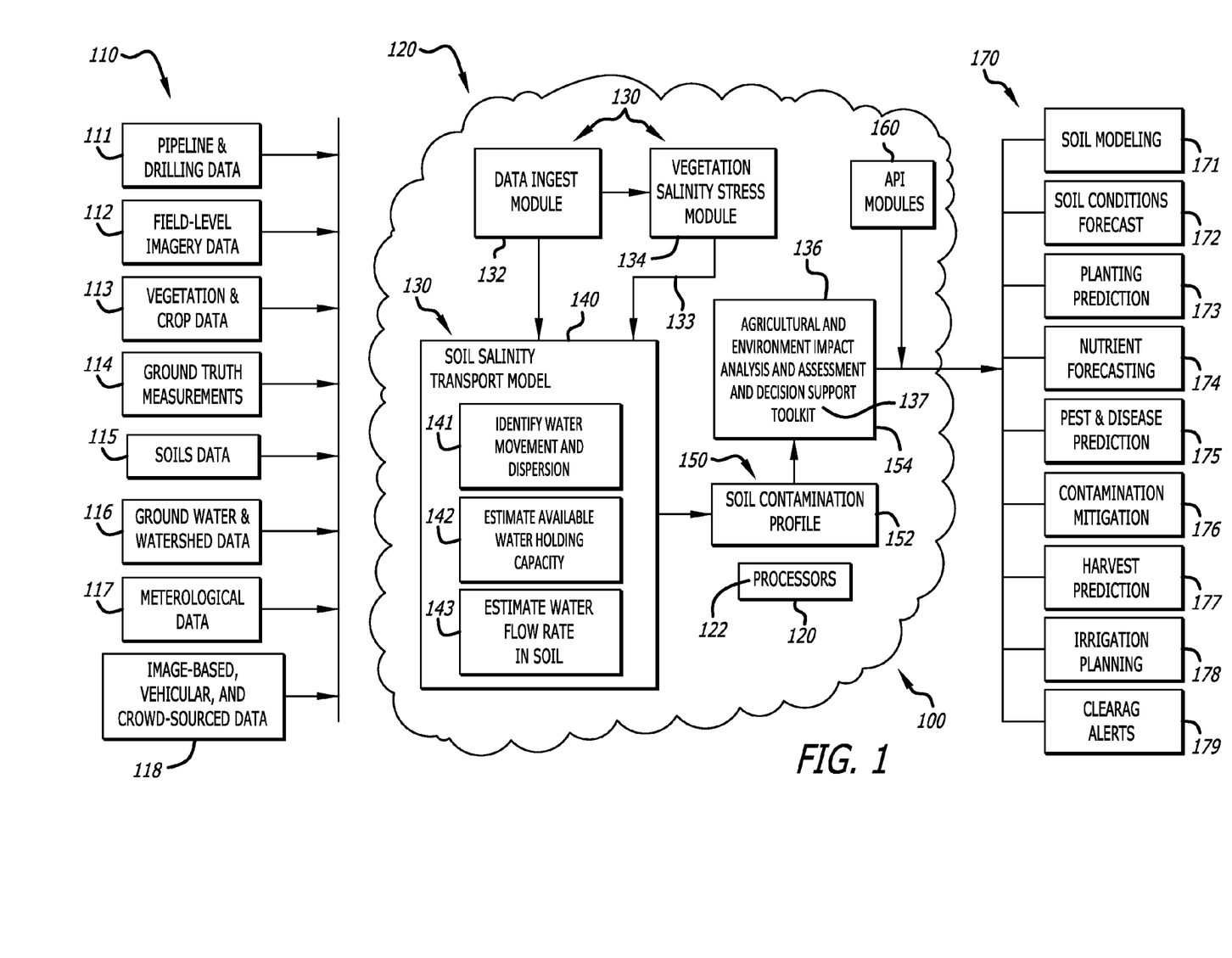
FIG. 1 is a systemic diagram of an analytical framework for soil contamination detection, assessment and impact analysis according to the present invention.

FIG. 1 is a diagram of system components in an analytical framework 100 for soil contamination detection, assessment and impact analysis according to the present invention. In this analytical framework 100, input data 110 is ingested from various sources for analysis in one or more data processing modules 130 within a computing environment 120. These data processing modules 130 are configured to receive, ingest, request, or otherwise obtain the data input data 110, perform a vegetation salinity stress assessment, and analyze both soil contamination from saltwater that is a by-product of oil and gas drilling operations in a soil salinity transport model 140, and the impact of such soil contamination on the surrounding environment ecosystem and associated activities. Accordingly, the analytical framework 100 of the present invention is understood and intended to have many different uses and forms of output data 150 and downstream or follow-on advisories 170, as discussed in further detail herein. One source of input data 110 is a plurality of database collections, which provide different types of input data 110 that are modeled within the present invention to define distinct activities required to support one or both of intermediate determinations of vegetation salinity stress or final determinations of soil contamination assessment and the resultant agricultural and environment impact as described further herein.

Figure 2:
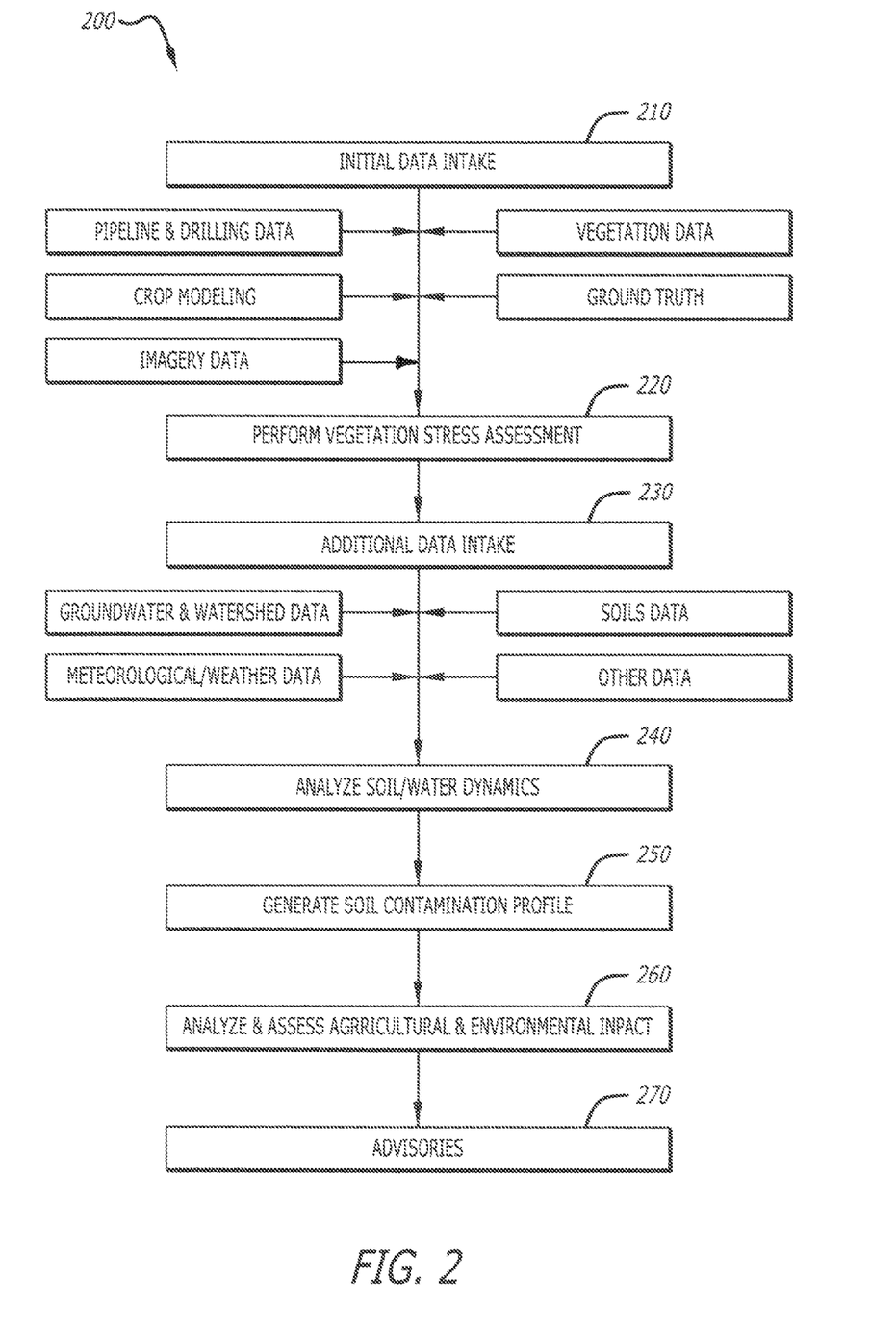
FIG. 2 is a block diagram of information flow from and within components of a modeling process for soil contamination detection, assessment and impact analysis according to the present invention.

FIG. 2 is a block diagram showing an example of information flow and steps in a modeling process 200 for soil contamination detection, assessment and impact analysis according to the present invention. The present invention performs an initial intake 210 of initial input data 110 by requesting or ingesting data from a plurality of database collections as described further herein. The present invention applies this initial intake 210 to perform a stress assessment 220 of vegetation salinity, and then performs an additional intake 230 of further input data 110. The result of the stress assessment 220 and additional input data 110 are applied to execute 240 the soil salinity transport model 140. Output data 150 is generated in step 250 from this soil salinity transport model 140, in the form of generating a soil contamination assessment 252 and generating an agricultural and environmental impact analysis 254. This output data 150 is provided to a further step 260 of generating one or more advisories.

The one or more data processing modules 130 of the analytical framework 100 and modeling process 200 for soil contamination detection, assessment and impact analysis include a data ingest module 132 configured to ingest, request, receive, or otherwise obtain input data 110, such as pipeline and drilling data 111, field-level remotely-sensed imagery data 112, remotely-sensed vegetation data and crop modeling outputs 113, and ground truth measurements 114. A vegetation salinity stress module 134 uses at least this information to perform an initial assessment 133 of vegetation salinity stress, and this information is then combined with soils data 115, groundwater and watershed data 116, and meteorological data 117 that includes historical, current and predicted weather data, and provided to the soil salinity transport model 140. The soil salinity transport model 140 is comprised of one or more additional data processing modules 130 that are specifically configured to analyze soil-water dynamics and model the movement of salts within the soil strata, and generate output data 150 at least in the form of a soil contamination profile 152 and an agricultural and environmental impact analysis and salinity contamination assessment 154.

The plurality of database collections may include a database that stores or otherwise maintains information related to oil and gas drilling activities and locations, and saltwater usage and pipelines attendant thereto. Prerequisite to monitoring and detecting unplanned saltwater release activities is the awareness of locations of new and existing oil and gas production. Pipeline and drilling data 111 that informs of such locations is collected by various commercial entities and is available as a data service. Input data 110 of this type is acquired from these entities and may be maintained in a separate pipeline and drilling database. Pipeline and drilling data 111 provides an inventory of information associated with oil and gas drilling, such as a production level, an amount of saltwater generated, methods for saltwater disposal for each location of production, location of saltwater disposal, and an incident history of saltwater contamination of soils.

Another type of input data 110 is field-level processed remotely-sensed imagery data 112. One source of this remotely-sensed imagery data 112 is satellite systems, such as fine temporal resolution low-earth orbit satellites that provide a minimum of three spectral bands and other resource-monitoring satellites, as well as from unmanned airborne systems (UAS) such as unmanned aerial vehicles and remotely-piloted vehicles, commonly referred to as drones. Other sources are also contemplated, such as for example unmanned aerial systems, manned aerial reconnaissance, lower temporal frequency earth resources satellite such as LANDSAT and MODIS, ground-based robots, and sensors mounted on field and farm equipment. Regardless of the source, this imagery data 112 is field-navigated to provide users with the most recent high-resolution depiction of the crop field. Imagery data 112 may be delivered on a web or application-based tool configured within the present invention, and additional tools may be provided for spatially navigating the imagery data 112 and overlaying a variety of weather data elements.

Another type of input data, vegetation and crop data 113, may be provided directly by growers or landowners in or near geographical areas or fields affected by salinity contamination or impacted by oil and gas drilling activities. This data 113 may be separately maintained in a vegetation and crop database, or may be collected by various commercial entities and provided as a data service via access to one or more database collections.

Vegetation and crop data 113 may also derived at least in part from such imagery data 112. It is to be noted that high-salinity discharge water is characterized as having a high electrolyte and sodium content. Near-infrared imagery data 112 is collected to determine potential contamination by monitoring changes in vegetation in impacted and control areas over time, using oil and gas production location data and associated SWD location data, and monitoring of vegetation via remote sensing. Deriving vegetation data 113 is performed by the use of vegetation indices, band ratioing, and temporal change detection procedures.

Many types of information may be included within the vegetation and crop data 113. As noted above, vegetation information may be derived from imagery data 112, vegetation indices, band ratioing, and temporal change detection procedures, and therefore this information is one aspect of the invention remotely acquired or sensed. Additionally, the vegetation and crop data 113 may also include output data of crop modeling paradigms, such as an augmented crop growth model that provide forecasts or other indications of expected growing degree days for various stages of crop growth. An example of such an augmented crop growth model may be found in U.S. Patent Publication No. 2014/0358486 A1. Other outputs of crop growth models that indicate phenological activity of crops may also be included within the information provided by vegetation and crop data 113, and it is to be understood that such data, and the analytical framework 100 and modeling process 200 for soil contamination detection, assessment and impact analysis provided by the present invention, are agnostic as to the model used or the type of crop modeled.

Remotely-sensed imagery data 112 collected on vegetation and crops from both impacted and non-impacted sites is therefore analyzed in the present invention according to one embodiment thereof to determine differences in plant health. As plants mature and produce greater levels of chlorophyll (biomass), they reflect higher levels of near-infrared (NIR) energy. As biomass increases with crop growth, NIR reflectance also increases. In stressed plants there will be a marked decrease in NIR reflectance relative to non-stressed plants. Also, plants absorb visible blue and red energy to help with photosynthesis. With lower chlorophyll (biomass), there is less photosynthesis and the less absorption of these wavelengths. In this manner, imagery data 112 can be used to monitor differences in plant health. Accordingly, it is one aspect of the analytical framework 100 and modeling process 200 for soil contamination detection, assessment and impact analysis of the present invention to analyze remotely-sensed vegetation and crop data 113 from such imagery data 112 within the soil salinity transport model 140.

To monitor all regions impacted by oil and gas production locations and SWD, periodic processing of satellite imagery 112 is conducted for areas designated from the pipeline and drilling database. Because of the potential for new, unplanned, and frequent saltwater release incidents, a relatively high return rate of imagery analysis is employed. For selected locations of high value, additional imagery is utilized from UAS platforms. The latter provides improved spatial resolution for the spectral band with the use of narrowband multi-spectral imaging, as well as a greater degree of control of the timing of data acquisition activities. The spatial resolutions from UAS improve to between 5- and 50-meters permitting better spatial delineation of contamination areas.

Field-level remotely-sensed imagery data 112 is used to map the crop field and may be applied to additional analytical paradigms to generate profiles of crop development and vitality for development of vegetation and crop data 113. Imagery data 112 may be analyzed using a normalized difference vegetative index (NDVI) that provides the user with an evaluation of plant health, biomass and nutrient content. Other approaches may also be employed for such analysis, such as: Modified Chlorophyll Absorption Ratio Index/Optimized Soil-Adjusted Vegetation Index (OSAVI), Triangular Chlorophyll Index/OSAVI, Moderate Resolution Imaging Spectrometer Terrestrial Chlorophyll Index/Improved Soil-Adjusted Vegetation Index (MSAVI), and Red-Edge Model/MSAVI. Regardless, analysis of imagery data 112 provides a meaningful further element to vegetation and crop data 113 because plants absorb short-wave radiation from the sun between wavelengths of 400-nm and 750-nm, which is their photo-synthetically active spectral region. Thus, healthy plants appear darker at these wavelengths. The addition of leaves on healthy plants results in strong reflection in the near infrared spectrum. These features provide the basis for categorizing plant species as well as monitoring vitality of plants using the NDVI analysis.

Validation of remotely-sensed, salt-impacted vegetation is indicative of in situ measurement of soil samples using data from ground truth measurements 114. The validation process uses multiple criteria for characterizing salt contamination in soils. A laboratory evaluation of an in situ measurement of a soil sample identifies many characteristics, such as salinity or total soluble salts (TSS), levels of exchangeable sodium percentage (ESP), and soil pH levels. TSS is represented as the electrical conductivity (EC) in a soil sample. The ESP is determined by examining the amount of the cation exchange capacity by sodium. Soils can then be classified as saline, saline-sodic, sodic, or normal on the basis of ESP, soil pH, and TSS values using such ground truth data 114. Additional data collection from soil-engaging EC measurement devices may also be indicated to further refine the analysis and resulting classifications.

The soil classification (e.g., saline or sodic) in ground truth data 114 is then used to determine the most appropriate assessment method for salt-contaminated soil. Because the bulk of plant nutrients and water come from the upper portion (for example, the upper 3 to 4 feet) of the soil column, testing for TSS, ESP and soil pH may be limited to the upper 4 feet of soil. Soil tests for these parameters may be necessary for areas where vegetation shows signs of stress. Site approval for soil testing is obtained through contact and agreement with landowners and crop growers with support from appropriate state and local regulatory agencies.

The combination of remotely-sensed vegetation data 113 and in situ measurement of ground truth data 114 in vegetation salinity monitoring provides additional data for categorizing the extent of vegetative stress in the analytical framework 100 and modeling process 200 for soil contamination detection, assessment and impact analysis of the present invention. The remotely-sensed vegetation data 113 is reduced to a vegetative index as noted above, providing a digital index for classification by an artificial neural network (ANN) that performs an analysis of the normalized difference vegetation index. The present invention is, as noted above, performed in a computing environment 120 that includes software and hardware components, such as for example one or more specifically-configured processors 122, configured to train the ANN to recognize the spectral characteristics of the diverse plant communities represented in the imagery data 112. Supporting the ANN is an unsupervised training approach that is run on the multi-layer image data 112 to produce a cluster analysis of spectral clusters that are used to provide corresponding signatures of impacted vegetation. The resulting signatures are presented as thematic layers providing a graduated extent of stress. Results of the cluster analysis are used to guide follow-up investigation with ground truth measurements 114. Confirmation of a saltwater impact with in situ measurements elevates the assessment to a notification level of a potential saltwater hazard, and client notification may then be made with a recommendation for follow-up monitoring for potential long-term soil contamination.

The analytical framework 100 and modeling process 200 provides a tiered approach to modeling salinity contamination in the systems and methods of the present invention. An initial set of input data (pipeline and drilling data 111, field-level imagery data 112, vegetation and crop data 113, and ground truth measurements 114) is applied, as noted above, to the vegetation salinity stress module 134 in this tiered approach to perform the stress assessment 220 as described above. Output from this module 134 and step 220 is then applied for further processing to the soil salinity transport model 140, together with the intake of additional input data in step 230.

Such additional input data includes soils data 115. A characterization of background soils is helpful to establish a baseline of salinity and sodicity for a specific location to enable a comparison with suspected vegetative salinity stress for that location. The background soil salinity, expressed in electrical conductivity (EC), and the sodicity, expressed in levels of sodium absorption ratio (SAR), are characterized by soils types described in the USDA NRCS Soil Survey Geographic (SSURGO) dataset maintained in a soils database. The SSURGO dataset contains background soil information as collected by the National Cooperative Soil Survey, over the course of a century. This soils data 115 is imported from a relational database where the attributes of selected land parcels can be queried in the analytical framework 100 and modeling process 200 based upon geospatial references for identified potential saltwater hazard location. Reference classifications of soils as saline, saline-sodic, sodic, or normal provided baseline EC and SAR values that are derived for the desired location from a lookup table relating soil types to typical EC and SAR values. Using this information, soil data 115 such as the soil type, porosity, soil horizons, and background salinity and sodicity are then provided to the soil salinity transport model 140 of the present invention.

The present invention may also ingest groundwater and watershed data 116 from a plurality of sources, for example from database collections that maintain and store data regarding wellhead and aquifer information. Precipitation that seeps downward through soil, filling interstitial spaces in a sand and gravel mixture, is called groundwater. If there is enough groundwater collected in a substrate of gravel and sand for agriculture and municipal supply use, it is termed an "aquifer". Groundwater flows through the sand and gravel laterally and eventually discharges into rivers and lakes. The rate of water movement in both a lateral and vertical direction has an important influence on the movement of salts in soil strata. Wellhead protection efforts provide a means of monitoring the quality of the aquifer and provide information on the depth to the saturated soil level. The depth to the saturated level fluctuates with seasonal and annual precipitation levels and becomes an important component in determining the extra area migration of salts from a primary contamination location.

The analytical framework 100 and modeling process 200 of the present invention may further apply historical, current, and predicted weather information in meteorological data 117 obtained from one or more meteorological and/or weather-related database collections. Such meteorological data 117 is utilized in the soil salinity transport model 140 because the precipitation and evaporation for a given location influences the hydrologic cycle at the location. This hydrologic cycle dictates water evaporation, and formation of clouds producing rains or snows onto the land. As rain falls or snow melts, water either evaporates, is taken up by plants, runs off to streams, lakes, or the ocean, or infiltrates into the soil. A fraction of the infiltration reaches the underground and maintains or raises the water table, and helps in recharge of the aquifer. This recharge also carries salt contaminants into the groundwater from the land surface and can result in the leaching of salts from beneath the plant root zone upwards through the root zone and eventually to the surface.

The evaporation and precipitation process is a critical part of the movement of salts in soils. Assimilation of daily meteorological data 117 in a database from which precipitation and evaporation can be determined supports the soil salinity transport model 140. This information also provides a near-real-time assessment of soil moisture conditions and supports both the generation of future precipitation/evaporation prediction and initialization of soil salinity transport estimation.

Many different types of meteorological data 117 may be used within the analytical framework 100 and modeling process 200 of the present invention, such as for example information related to meteorological characteristics including atmospheric temperature, humidity, wind speed, various forms of precipitation, downwelling radiation, and other such information. Such data 117 may be derived from, for example, radar data collected from radar sensing systems, and satellite data from satellite-based weather observation and tracking systems. The present invention may ingest data from numerical weather prediction models and surface networks such as described further herein. Weather data may also be derived from data generated from crowd-sourced observations using mobile applications configured on devices such as telephones and tablets, and using social media feeds. Such crowd-sourced observations may, for example, be generated from devices installed on or used within farm or other such equipment. Weather information may also be generated from meteorologist input.

The different sources of meteorological data 117 may also include information from both in-situ and remotely-sensed observation platforms. For example, the numerical weather models (NWP) and/or surface networks may be combined with data from weather radar systems and satellites to reconstruct the current weather conditions on any particular area to be analyzed. There are numerous industry NWP models available, and any such models may be used to input weather variables in the present invention. NWP models used herein at least include RUC (Rapid Update Cycle), WRF (Weather Research and Forecasting Model), GFS (Global Forecast System), and GEM (Global Environmental Model). This weather data is received in real-time, and may come from several different NWP sources, such as from Meteorological Services of Canada's (MSC) Canadian Meteorological Centre (CMC), as well as the National Oceanic and Atmospheric Administration's (NOAA) Environmental Modeling Center (EMC), and many others. Additionally, internally or privately-generated "mesoscale" NWP models developed from data collected from real-time feeds to global observation resources may also be utilized. Such mesoscale numerical weather prediction models may be specialized in forecasting weather with more local detail than the models operated at government centers, and therefore contain smaller-scale data collections than other NWP models used. These mesoscale models are very useful in characterizing how weather conditions may vary over small distances and over small increments of time. The present invention may be configured to ingest data from all types of NWP models, regardless of whether publicly, privately, or internally provided or developed.

Other types of input data 110 ingested into the present invention may include image-based data, vehicular data, and crowd-sourced observational data 118. Image-based data may be derived from systems such as video cameras, and vehicular data may be generated from one or more vehicle-based sensing systems, including those systems coupled to computing systems configured on farm equipment, or those systems configured to gather weather data from mobile devices present within vehicles, such as with mobile telephony devices and tablet computers. Data 118 may also be provided by crowd-sourced observations, for example from oil and gas well workers, growers, farmers and others using mobile telephony devices or tablet computers, or any other computing devices, that incorporate software tools such as mobile applications for accessing and using social media feeds.

In the present invention, the soil salinity transport model 140 is performed within one or more data processing modules 130, within a computing environment 120 comprised of hardware and software components that include at least one specifically-configured processor 122, as noted throughout. The at least one specifically-configured processor 122 is arranged to execute program instructions that process the various types of input data 110 and carry out the analytical functions as described further herein. Also included is a data ingest module 132 configured to receive input data 110 and distribute that information to the various modules within the vegetation salinity stress module 134, additional data processing modules 136, decision support toolkit 137, the soil salinity transport model 140, and generally within the analytical framework 100 and modeling process 200 of the present invention.

It is to be understood that the capacity of soil to regulate the ground and atmosphere water supply is a fundamental aspect of an environmental ecosystem. When water percolates through soil, it is filtered, stored for plant uptake, and redistributed across tortuous flow paths to groundwater and surface water bodies. This creates a sustainable water resource (considering both quantity and quality) that is directly influenced by soil and environmental ecosystems.

Soil water dynamics involve many factors that vary in a vertical direction with depth, in a lateral direction across soil horizons, and temporally in response to short-term and long-term weather and climate. The soil salinity transport model 140 of the present invention analyzes such soil water dynamics by considering at least the following fundamental concepts: 1) generation of a soil-moisture balance equation to analyze and associate water movement; 2) incorporation of factors and soil properties that govern water potential and plant/soil available water holding capacity; and 3) inclusion of soil morphology and classification methods to describe the life-cycle of water in soil. These concepts are integrated with salinity and sodicity characteristics to estimate a time-dependent representation of EC, SAR, ESP, soil pH, and TSS values.

The soil salinity transport model 140 formulates these concepts under several assumptions. One such assumption is a horizontal flow in groundwater aquifer. Another is a two-dimensional, mainly lateral water flow. The soil salinity transport model 140 further assumes a laminar flow in a saturation zone. Another assumption is an unconfined aquifer with heterogeneous isotropy soil properties. A further assumption is that sources of water are restricted to precipitation (either natural or supplemental, such as via irrigation) and saltwater.

As noted above, the soil salinity transport model 140 generates a soil-moisture balance equation for each point of water flow and salt flow in the root zone portion of the soil-water ecosystem. This balance equation analyzes water holding capacity and movement in soil, considers the following parameters for each point: soil porosity (n); rooting depth ($Z_r$); water surface supply rate (P); evaporation/evapotranspiration (E); runoff (R); and drainage (D).

The water surface supply rate typically represents the net water at the upper soil surface that is supplied either from atmospheric sources or from irrigation. When considering atmospheric sources available in the form of rainfall, this value is generated from measured or estimated precipitation with a fractional reduction due to vegetative interception of rainfall. In the event of frozen precipitation where the soils have a frost front beneath the root zone, the water surface supply rate is equivalent to the snowmelt rate at the upper soil surface. The drainage parameter represents the amount of water lost from the root zone due to infiltration to soil horizons beneath the root zone or through lateral movements outside the model lateral boundaries. The model 140 computes the time varying matric potential and soil field capacity by considering the remnant soil moisture after losses due to evaporation/evapotranspiration and leakage. This is expressed as:

$$nZ_r \frac{ds}{dt} = PRED$$

where s is the sum of the matric potential and soil field capacity.

The matric potential and soil field water capacity describe the ability of water to move in soil, and along with the lateral and vertical drainage, provide an opportunity to estimate the transport and accumulation of TSS and water flows across a watershed or sub-watershed. Extending this to consider regions containing suspected saltwater contamination, the area of study is subdivided into cells for calculating the lateral transfer of water/salt. This movement is characterized as an unconfined flow of groundwater where for unsteady flow it can be expressed in a general flow equation that combines Darcy's Law with mass conservation. Given the slow rate of soil water movement, the kinetic energy generated is minimal and suggests that flow is driven in the direction of the potential energy gradient where the soil water potential is dominated by the matric potential. The resulting flows are dependent upon this soil water potential as determined from the preceding relationship for time-varying matric potential and soil water field capacity.

The groundwater aquifer is defined from the affiliated groundwater database with fluctuations provided by well-head monitors for the watershed in question. Since the groundwater basin is considered impermeable at the bottom layer, flow of water and salt is restricted to horizontal and upward (leaching) movement with time. Water and salt movement due to its relationship with water potential in soil is closely linked with storage. The dynamics of the soil water flow is influenced by the soil texture and structure, plus the accumulation of salt. For flow restricted to two dimensions the resulting Laplace equation in terms of the hydraulic head can be solved readily using methods such as successive over-relaxation.

The movement and dispersion of water and solute are estimated using a modified form of the Richards equation. This equation is based upon the volume wetness and matric suction head and given by:

$$\frac{\partial \theta}{\partial t} = -\nabla \cdot [K \nabla \psi] + \frac{\partial K}{\partial z}$$

where $\theta$ and $\psi$ are the volume and matric suction head, respectively and K is the hydraulic conductivity and strongly dependent upon soil moisture. The salinity transport is described using a general advection-dispersion relationship given by:

$$\frac{\partial \theta c}{\partial t} = \nabla \cdot \left( \theta \vec{D} \cdot \nabla c - \vec{q} c \right)$$

where:
c is the saline concentration;
$\vec{q}$ is the Darcy-Buckingham water flux vector; and
$\vec{D}$ is the dispersion tensor.

A measured salt concentration provides an estimation of water flow rates as a function of the potential energy gradient and the soil saturated hydraulic conductivity, which is governed by porosity. Since the porosity will diminish with increased salinity, the increased electric conductivity will serve as an output metric to the extent of salination occurring in the soils. As differing soils will have different morphological characteristics, the soils database provides soils data forming the basis for initialization of soils type in the region being analyzed to further categorize life-cycles of water in soils. For example, clay-rich soils have low saturated hydraulic conductivity. Conversely, sandy soils have larger pores that facilitate rapid water flow.

The analytical framework 100 and modeling process 200 of the present invention generates an assessment of salinity contamination of soils in a decision support toolkit 137 that incorporates the various levels of information that are aggregated and modeled. The decision support toolkit 137 may generate the agricultural and environmental impact analysis and salinity contamination assessment 154 using the soil contamination profile 152 in one or more data processing modules 136.

The decision support toolkit 137 may be configured so that salinity contamination of soils is graphically depicted from solutions to the analysis soil-water dynamics performed in the soil salinity transport model 140. Varying levels of initialized values permits the end user to gain an awareness of the levels of contamination both from spatial and temporal perspectives. Providing varying levels of assumed or observed atmospheric conditions further provides guidance on the extent of present and potential future contamination.

The present invention provides this assessment via, in one embodiment, a graphical user interface that may include a mapping workspace with associated selectable analysis and graphics tools, plus drop-down dialog boxes for selecting specific user desired operations. The assessment process incorporates a user interface for management and evaluation of all data collected. Each event exists as a distinct object with a separate file hierarchy producing a case file repository. The decision support toolkit provides both a geospatial representation of the remotely-sensed vegetation data (i.e., satellite and UAS imagery), ground truth information (i.e., surface and sub-surface field measurements, documented reports of events and actions), and projections of potential spatial changes in the contamination levels with respect to time.

The decision support toolkit 137 also includes event configurable resources that provide a framework for data mining of the observed and modeled information to explore extent of potential contamination. The configurable resources include spectral settings for evaluating imagery data, configurable thresholds for EC, SAR, ESP, soil pH, and TSS values, and configurable threat level thresholds for defining contamination levels. To provide delineation of event extents, the toolkit has an interactive geospatial mapping capability to establish variable spatial buffers. An interactive text tool permits the analyst to generate event documentation of contamination level findings. The combination of the information is depicted thematically with defined algorithms for combining the thematic factors to produce a weighted soil contamination index.

The present invention generates the soil contamination profile 152 and the agricultural and environmental impact analysis and salinity contamination assessment 154 as output data 150 that may be customized and provided to end users such as well operators, landowners, livestock owners, and the agriculture industry generally as a service. End-users for the output data 150 of the analytical framework 100 and modeling process 200 of the present invention is targeted to a varied audience. The output data 150 supports oil and gas operators required to monitor for soil salinity contamination; landowners and crop producers who are impacted by salination problems; and government monitors and regulators for soil salination and mitigation activities, among many others. The decision support toolkit 137 may, in one embodiment, reside on an end-user's desktop computer or as a mobile application that interfaces to a host computer that is provides the modeling and guidance generation. The mapping functions on the end-user's interface can be exported to other GIS software platforms or to spreadsheets related to data management systems used by the end-user. Analysis and interpretations services can be added from the service provider as part of a consultation service.

In one embodiment, the decision support toolkit 137 may be configured to generate haptic vibrations or other tactile notifications to the user's mobile or other computing device. Other types of notifications may include those provided via applications resident on mobile telephony, tablet, or wearable devices are also possible, such as for example a voice-based output generated to verbally notify farmers or growers of increased risk of contamination or a recommended change in irrigation practice for a specific period of time. The present invention also contemplates that output data 150 may be generated for visual representation of the information contained, for example on a graphical user interface. For example, users may be able to configure settings for, and view various aspects of, the analytical framework 100 and modeling process 200 of the present invention using a display on such a graphical user interfaces, and/or via web-based or application-based modules. Tools and pull-down menus on such a display (or in web-based or application-based modules) may also be provided to customize the various aspects of the soil salinity transport model 140, as well as the output data 150.

As noted above, the output data 150 of the present invention may be used to generate a plurality of advisory services 170 in conjunction with one or more application programming interface (API) modules 160. These advisory services 170 provide enhanced decision-making support to several aspects of both responsive action to soil contamination and precision agricultural production in the presence of soil contamination.

These advisory services 170 are driven by generation of the reporting aspects of the output data 150 within the soil contamination profile 152 and agricultural and environmental impact analysis and salinity contamination assessment 154. Each of advisory service 170 enriches the utilization and application of the analytical framework 100 and detection and modeling process 200 of the present invention.

One such advisory service 170 is a soil modeling service 171. A specific API module 160 is incorporated enable application of the output data 150 to one or more sophisticated soil models to generate information that provides a better understanding of current and future soil conditions relative to historical soil conditions and light of the presence of salts in the soil contamination profile 152. Such soil models support the use of existing soil properties e.g., organic matter, soil type, etc., tillage practices, presence of tile drainage, and irrigation history, along with the advanced long-range weather forecasting that may also be applied to the present invention in meteorological data 117. This coupling of the soil contamination profile 152 with advanced weather forecasting information for an entire growing season provides a valuable tool for indicating crop potential in the presence of contamination soils. The output of an API module 160 generating this soil modeling service 171 may be further configured to provide a detailed past-through-future analysis of soil temperature and moisture assessments, including freeze and thaw information, the amount of water 'throughput', runoff or ponding of soils, and an important interpretation of workability of the soils. Soil models contemplated for use in the present invention may include models such as the EPIC, APEX, and ICBM soil models.

Another advisory service 170 is soil conditions forecasting service 172. The soil modeling service 171 allows the soil contamination profile 152 and agricultural and environmental impact analysis and salinity contamination assessment 154 to be used with at least the predicted weather information from the meteorological data 117 and the pipeline and drilling data 111 to provide an estimate of a state of future soil condition and generate a forecast of soil temperature and moisture conditions for the specified field location. Such a forecast enables anticipation of periods of suitable soil conditions for field operations, including workability, particularly those after periods of rainfall, with an understanding of the presence of salts in soils and specific field locations. Such a forecast enables anticipation of in-field crop dry-down and moisture levels at specific times that impact drying costs and storage costs.

As noted above, the vegetation and crop data 113 may include crop modeling information, such as output data of an augmented crop growth model that indicates of expected growing degree days for a timeline for the various stages of crop growth. When utilized prior to the growing season using the soil condition forecasting service 172, the present invention can be configured to provide a planting prediction reporting service 173 as an advisory service 170 that enables simulation of an entire growing season before it occurs, while taking into account a salinity contamination assessment from the soil contamination profile 152 and the agricultural and environmental impact analysis and salinity contamination assessment 154. This may be applied with season-long weather forecasting capabilities and an assessment of accumulated growing degree days throughout the growing season enables making an informed decision as to what type of crop or its cultivar to select, optimization of successful completion of a selected crop, and mitigation activities such as what crops to plants and when to alleviate salinity contamination. When coupled with an entire growing season's growing degreed days estimation and the weather output from an extended range weather forecast, a planting prediction reporting service 173 provides multi-faceted information regarding planting operations, such as near-term field conditions (soil moisture and temperature) and expected seasonal growth metrics. This planting prediction reporting service 173 provides likely periods of suitability of weather and soil conditions, including soil workability, soil temperatures, potential adverse post-planting weather conditions, and the likelihood that the crop will reach maturity under salinity contamination.

Yet another advisory 170 as a downstream or follow-on service from output data 150 of the present invention is a nutrient forecasting service 174. The present invention may, as noted above, further incorporate crop modeling information as part of vegetation data 113, and this can provide knowledge of expected growing degree days for a timeline for the various stages of crop growth. Each of these stages has differing nutrient needs, and this may be heavily influenced by the present of salinity indicated by the soil contamination profile 152 and the agricultural and environmental impact analysis and salinity contamination assessment 154. The nutrient forecasting service 174 uses timing of these stages predicted by the accumulated growing degree day timeline along with output data from the soil modeling service 171 and/or soil conditions forecasting service 172 to identify periods of suitability of soil conditions for continued satisfactory crop growth, and anticipates the impact of soil contamination on saturation and the loss of available nutrients via leaching, denitrification, and other soil and water-related crop growth factors. The nutrient forecasting service 174 may also provide a recommendation of how much plant nutrient, such as a fertilizer or other plant or soil treatment, should be applied and an estimate of how much of the treatment applied at the crop's location may be leached away by excessive moisture and soil saturation in light of the assessment in the soil contamination profile 152 and agricultural and environmental impact analysis and salinity contamination assessment 154. The nutrient forecasting service 174 may also be used retrospectively to evaluate treatment effectiveness loss due to soil and rain conditions that have recently occurred in the presence of contamination.

Another advisory service 170 as a downstream or follow-on service from output data 150 of the present invention is a pest and disease prediction service 175. The presence of saltwater contamination of soil strata may have an impact on the type and nature of pests and diseases that infiltrate soil strata, which in turn has differing impacts depending upon the growth stage of a crop. Similarly, the variability of weather conditions can further influence potential crop disease and pest conditions, and the output of an augmented crop growth model provides a timeline identification of the various crop growth stages. This information informs a valuable tool for deciding the best course for integrated pest and disease management activities in response to the soil contamination assessment. The pest and disease prediction service 175 therefore provides assessments of the conduciveness of contaminated soils to various disease and pest pressures at the current time through the end of the growing season. The pest prediction information from this advisory service 170 helps in assessing the relative risk vs. reward i.e., cost vs. benefit, of potential applications such as pesticides to prevent crop damage due to factors such as disease or insects.

Another advisory service 170 as an output of the present invention is a salinity contamination mitigation service 176. The presence of saltwater contamination of soil strata has an obvious impact on crop planting, growing, and harvest conditions. Certain crops however may act to mitigate the impact of salinity contamination on soils, and therefore an advisory service 170 may be provided that assists growers and landowners with contamination mitigation activities to improve planting, growing, and harvest conditions of other or future crops. Such contamination mitigation service 176 may provide suggested seed information, periods of time for planting and harvesting of mitigating crops or other vegetation, and suggested applicants to further reduce the impact of salinity contamination, particularly combined with information such as groundwater and watershed data 116 and meteorological data 117. The contamination mitigation service 176 may combine information contained within the soil contamination profile 152 and agricultural and environmental impact analysis and salinity contamination assessment 154 with outputs from other services to further tailor mitigation activities.

Irrigation is another issue heavily affected by salinity contamination of soils. The present invention contemplates an irrigation advisory service 177 as another advisory service 170 as an output of the present invention. In addition to affecting crop planting, growing, and harvest conditions, the presence of excessive salts in soil strata also has a major impact on the movement of water throughout layers of soil as noted throughout. Accordingly, such an advisory service may be of help to growers and landowners in planning for irrigation activities throughout a growing season where soils have been contaminated. As with other advisories, the irrigation advisory service 177 may combine aspects of input data 110 with output data of an augmented crop growth model that indicates of expected growing degree days for a timeline for the various stages of crop growth and information with the soil contamination profile 152 and agricultural and environmental impact analysis and salinity contamination assessment 154 to produce specific information that helps growers and landowners optimize irrigation activities in fields with contaminated soils.

One major implication of the presence of excessive salts on the movement of water throughout layers of soil is contamination of the groundwater and aquifer systems, whether or not they are part of the geographical area being monitored and modeled. It is therefore to be understood that surface irrigation may itself be contaminated from its source, even where soil systems in the same geographical are not themselves contaminated. In other words, irrigation water being applied to crops or fields may include contaminated surface or groundwater, and this may have a material impact on crop growth and rangeland.

It is therefore to be further noted that the analytical framework 100 and detection and modeling process 200 of the present invention may also be configured to generate a corresponding assessment of groundwater and aquifer contamination. The irrigation advisory service 177 may therefore also be configured to provide, in addition to an irrigation recommendation based on soil contamination, a further recommendation that takes into account contamination of groundwater and aquifer systems. The analytical framework 100 and detection and modeling process 200 of the present invention may model additional input data 110 in the form of information from an irrigation model that specifically analyzes contamination in groundwater and aquifer systems, whether it be from salinity contamination of soils or from other sources. Therefore the irrigation advisory service 177 may be enhanced to provide recommendations for growers and landowners in planning for irrigation activities throughout a growing season where the irrigation source has itself been contaminated. This enhanced irrigation advisory service 177 may also provide such recommendations solely based on water contamination.

Another advisory service 170 that combines information provided by the soil contamination profile 152 and agricultural and environmental impact analysis and salinity contamination assessment 154 outputs with information generated by an augmented crop growth model is a "harvest helper" reporting service 178. Accumulated growing degree day estimations that are routinely updated provide an important metric for determining when a crop will reach maturity. However, it should be noted that the harvest of a crop involves factors that are heavily affected by vegetation stress from excessive salinity, and from soil strata contaminated with salts. The harvest helper reporting service 178 applies the soil contamination profile 152 and agricultural and environmental impact analysis and salinity contamination assessment 154 together with soil conditions forecast 172 and information such as crop, plant, and weather data to estimate the timing of harvest operations. Such an advisory may also weigh the relative costs of fuel-based forced-air drying vs. the risks associated with loss of standing crop to adverse weather conditions. The harvest helper reporting service 178 also provides information on possible loss of field workability due to the presence of salts in the soil layers prior to post-harvest tillage. This reporting service 178 may be further used to develop additional tools that include estimation standing crop dry-down rates, harvest dates and suitability, fuel consumption optimization for forced-air drying, and plant 'toughness', and other issues affected by salinity contamination.

Each of the above advisories may be provided separately, bundled, or customized as a "ClearAg Alerts" service 179. The importance of information provided to production agriculture in the present invention dictates a necessity for an effective and direct method of conveying information. The ClearAg Alerts service 179 may utilize a 'push' technology for immediate and direct dissemination of information provided as output data 150. The API module 260 that generates this service 179 may be configured to so that users may receive alerts for the purposes of managing and timing field operations in light of existed and forecasted salinity contamination. This is supported by user-specified elements including alert parameters, location(s), lead time(s), time(s) of day, and the particular device(s) to receive the alerts.

The systems and methods of the present invention may be implemented in many different computing environments 120. For example, they may be implemented in conjunction with a special purpose computer, a programmed microprocessor or microcontroller and peripheral integrated circuit element(s), an ASIC or other integrated circuit, a digital signal processor, electronic or logic circuitry such as discrete element circuit, a programmable logic device or gate array such as a PLD, PLA, FPGA, PAL, and any comparable means. In general, any means of implementing the methodology illustrated herein can be used to implement the various aspects of the present invention. Exemplary hardware that can be used for the present invention includes computers, handheld devices, telephones (e.g., cellular, Internet enabled, digital, analog, hybrids, and others), and other such hardware. Some of these devices include processors (e.g., a single or multiple microprocessors), memory, nonvolatile storage, input devices, and output devices. Furthermore, alternative software implementations including, but not limited to, distributed processing, parallel processing, or virtual machine processing can also be configured to perform the methods described herein.

The systems and methods of the present invention may also be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Additionally, the data processing functions disclosed herein may be performed by one or more program instructions stored in or executed by such memory, and further may be performed by one or more modules configured to carry out those program instructions. Modules are intended to refer to any known or later developed hardware, software, firmware, artificial intelligence, fuzzy logic, expert system or combination of hardware and software that is capable of performing the data processing functionality described herein.

The foregoing descriptions of embodiments of the present invention have been presented for the purposes of illustration and description. It is not intended to be exhaustive or to limit the invention to the precise forms disclosed. Accordingly, many alterations, modifications and variations are possible in light of the above teachings, may be made by those having ordinary skill in the art without departing from the spirit and scope of the invention. It is therefore intended that the scope of the invention be limited not by this detailed description. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

The invention claimed is:

1. A method comprising:
   ingesting, as input data, pipeline and drilling data, field-level remotely-sensed imagery data, remotely-sensed vegetation data, crop data, ground truth data representing in-situ measurement of vegetation and soil salinity, soils data, groundwater and watershed data, and meteorological data, for a geographical area comprising a soil system;
   modeling the input data in a plurality of data processing modules within a computing environment in which the plurality of data processing modules are executed in conjunction with at least one specifically-configured processor, the data processing modules configured to assess vegetation salinity stress and analyze soil-water dynamics in the soil system, by
      categorizing the vegetation stress by generating a vegetative index from spectral characteristics of vegetation in the field-level remotely-sensed imagery data and the remotely-sensed vegetation data, and performing a cluster analysis of the spectral characteristics to identify one or more indicators of vegetation salinity stress in impacted vegetation, estimating a movement and dispersion of water and solute in the soil system, by 1) analyzing a soil-moisture balance for each point of water flow and salt flow in a root zone portion of the soil system from an evaluation of soil porosity, rooting depth, water supply surface rate, evaporation, evapotranspiration, runoff, and drainage, and 2) computing a time-varying matric potential and soil field capacity of the soil system from remnant soil moisture after losses due to evaporation, evapotranspiration, runoff, and drainage, and measuring a salinity concentration in the soil system by comparing the one or more indicators of vegetation salinity stress in impacted vegetation with the ground truth data representing in-situ measurement of vegetation and soil salinity for the geographical area comprising a soil system to confirm the vegetation salinity stress in the impacted vegetation, and estimating a water flow rate as a function of a potential energy gradient and a hydraulic conductivity; and generating, as output data, a salinity contamination profile representing a contamination impact assessment for the soil system.

2. The method of claim 1, wherein the modeling the input data further comprises evaluating one or more of plant health, plant biomass, and plant nutrient content in the geographical area from one or more of the field-level remotely-sensed imagery data and the remotely-sensed vegetation data to perform an initial assessment of vegetation salinity stress.

3. The method of claim 2, wherein the one or more advisories include at least one of a soil conditions forecast, a planting prediction, a nutrient treatment forecast, a contamination mitigation recommendation, a harvest prediction, and an irrigation forecast.

4. The method of claim 1, wherein salinity contamination profile is applied to an agricultural and environmental support tool to generate one or more advisories representing an agricultural and environmental analysis of salinity contamination of the soil system.

5. The method of claim 1, wherein the salinity contamination profile is configured to provide a geospatial representation of one or more of the remotely-sensed vegetation data, ground truth data relative to surface and sub-surface field measurements and documented reports of events and actions, and projections of potential spatial changes in contamination levels of the soil system over time.

6. The method of claim 1, wherein the input data includes one or more of image-based data collected from a camera, vehicular data collected from a vehicle-based sensing system, and crowd-sourced observational data.

7. The method of claim 1, wherein the meteorological information includes historical, current, and predicted weather conditions in the geographical area comprising the soil system.

8. The method of claim 7, wherein the predicted weather conditions are generated by one or more predictive numerical weather models.

9. The method of claim 1, wherein the crop data includes information generated from an augmented crop growth model configured to indicate various stages of crop growth for the geographical area comprising the soil system.

10. The method of claim 1, wherein the soils data enables initialization of a soils type in the geographic region being analyzed to further categorize cycles of water in soils.

11. A system comprising:
a computing environment including at least one computer-readable storage medium having program instructions stored therein and at least one computer processor operable to execute the program instructions to model soil-water dynamics for a soil system within a plurality of data processing modules, the plurality of data processing modules including:

an initial vegetation assessment module configured to evaluate one or more of plant health, plant biomass, and plant nutrient content in the geographical area from one or more of field-level remotely-sensed imagery data and remotely-sensed vegetation data to perform an initial assessment of vegetation salinity stress in a geographical area comprising the soil system to categorize the vegetation salinity stress by generating a vegetative index from spectral characteristics of vegetation in the one or more of field-level remotely-sensed imagery data and the remotely-sensed vegetation data, and performing a cluster analysis of the spectral characteristics to identify one or more indicators of vegetation salinity stress in impacted vegetation;

one or more modules configured to 1) estimate a movement and dispersion of water and solute in a soil system, by analyzing a soil-moisture balance for each point of water flow and salt flow in a root zone portion of the soil system from an evaluation of soil porosity, rooting depth, water supply surface rate, evaporation, evapotranspiration, runoff, and drainage, and computing a time-varying matric potential and soil field capacity of the soil system from remnant soil moisture after losses due to evaporation, evapotranspiration, runoff, and drainage, and 2) measure a salinity concentration in the soil system by comparing the one or more indicators of salinity stress in impacted vegetation with ground truth data representing in-situ measurement of vegetation and soil salinity for the geographical area comprising the soil system to confirm the vegetation salinity stress in the impacted vegetation, and estimating a water flow rate as a function of a potential energy gradient and a hydraulic conductivity; and an impact assessment module configured to generate one or more advisories representing an agricultural and environmental analysis of salinity contamination of the soil system in a soil contamination profile.

12. The system of claim 11, further comprising a data ingest module configured to receive, as input data, one or more of pipeline and drilling data, the field-level remotely-sensed imagery data, the remotely-sensed vegetation data, crop data, the ground truth data representing in situ measurement of vegetation and soil salinity, soils data, groundwater and watershed data, and meteorological data that includes historical, current, and predicted information of weather conditions, for the geographical area comprising the soil system.

13. The system of claim 12, wherein the input data includes one or more of image-based data collected a camera, vehicular data collected from a vehicle-based sensing system, and crowd-sourced observational data.

14. The system of claim 12, wherein the crop data includes information generated from an augmented crop growth model configured to indicate various stages of crop growth for the geographical area comprising the soil system, and wherein the soils data enables initialization of a soils type in the geographic region being analyzed to further categorize life-cycles of water in soils.

15. The system of claim 12, wherein the soil contamination profile represents a contamination impact assessment for the soil system and includes a geospatial representation of one or more of the remotely-sensed vegetation data, ground truth data relative to surface and sub-surface field measurements and documented reports of events and actions, and projections of potential spatial changes in contamination levels over time.

16. The system of claim 11, wherein the one or more advisories include at least one of a soil conditions forecast, a planting prediction, a nutrient treatment forecast, a contamination mitigation recommendation, a harvest prediction, and an irrigation forecast.

17. A method of modeling salinity contamination in a soil system, comprising:
within a computing environment comprised of a computer processor and at least one computer-readable storage medium operably coupled to the computer processor and having program instructions stored therein, the computer processor being operable to execute the program instructions to profile soil contamination in a vegetation salinity stress assessment and soil salinity transport model configured to perform the steps of:
identifying one or more indicators of vegetation salinity stress in impacted vegetation by generating a vegetative index from spectral characteristics of vegetation in one or more of field-level remotely-sensed imagery data and remotely-sensed vegetation data, and performing a cluster analysis of the spectral characteristics;
identifying water movement and dispersion for each point of water flow and salt flow in a root zone portion of a soil system by evaluating soil porosity, rooting depth, water supply surface rate, evaporation, evapotranspiration, runoff, and drainage to analyze a balance of soil and water in the soil system;
estimating an available water holding capacity in the soil system by applying water characteristics and soil properties to the water movement, and comparing the one or more indicators of vegetation salinity stress in impacted vegetation with ground truth data representing in-situ measurement of vegetation and soil salinity in the soil system to confirm the vegetation salinity stress in the impacted vegetation, and;
categorizing a water life cycle to estimate a water flow rate in the soil system by integrating one or more soil classifications and one or more soil morphological characteristics with the available water holding capacity and the water movement; and
assessing a salinity contamination of the soil system.

18. The method of claim 17, further comprising assessing the vegetation salinity stress by evaluating one or more of plant health, plant biomass, and plant nutrient content in a geographical area comprising the soil system from the one or more of the field-level remotely-sensed imagery data and the remotely-sensed vegetation data.

19. The method of claim 17, further comprising generating one or more advisories representing an agricultural and environmental analysis of salinity contamination of the soil system.

20. The method of claim 19, wherein the one or more advisories include a soil conditions forecast, a planting prediction, a nutrient treatment forecast, a contamination mitigation recommendation, a harvest prediction, and an irrigation forecast.

21. The method of claim 17, further comprising modeling a plurality of input data that includes one or more of pipeline and drilling data, the field-level remotely-sensed imagery data, remotely-sensed vegetation data, crop data, ground truth data representing in situ measurement of vegetation and soil salinity, soils data, groundwater and watershed data, and meteorological data that includes historical, current, and predicted information of weather conditions, for a geographical area comprising the soil system.

22. The method of claim 21, wherein the input data further includes one or more of image-based data collected from a camera, vehicular data collected from a vehicle-based sensing system, and crowd-sourced observational data.

23. The method of claim 21, wherein the crop data includes information generated from an augmented crop growth model configured to indicate various stages of crop growth for the geographical area comprising the soil system, and wherein the soils data enables initialization of a soils type in the geographic region being analyzed to further categorize water life cycles of water in soil.

* * * * *